(12) United States Patent
Leopold et al.

(10) Patent No.: US 7,685,901 B2
(45) Date of Patent: Mar. 30, 2010

(54) DEVICE FOR MOVABLE SUPPORT OF AN INPUT/OUTPUT UNIT

(75) Inventors: Gunter Leopold, Baiersbronn (DE); Armin Stern, Oberndorf (DE)

(73) Assignee: fischer automotive systems GmbH, Horb (DE)

( * ) Notice: Subject to any disclaimer, the term of this patent is extended or adjusted under 35 U.S.C. 154(b) by 578 days.

(21) Appl. No.: 11/610,539

(22) Filed: Dec. 14, 2006

(65) Prior Publication Data

US 2007/0144853 A1 Jun. 28, 2007

(30) Foreign Application Priority Data

Dec. 24, 2005 (DE) .................... 10 2005 062 316

(51) Int. Cl.
*F16H 55/17* (2006.01)

(52) U.S. Cl. .................. 74/434; 296/73; 296/24.34; 296/37.12

(58) Field of Classification Search .......... 74/431, 74/434; 296/70, 73, 24.34, 37.12
See application file for complete search history.

(56) References Cited

U.S. PATENT DOCUMENTS

| 6,249,744 B1 | 6/2001 | Hiroyuki | |
|---|---|---|---|
| 6,295,883 B1 * | 10/2001 | Tsukada et al. | 74/89.18 |
| 6,499,788 B2 * | 12/2002 | Ito et al. | 296/70 |
| 6,663,155 B1 * | 12/2003 | Malone et al. | 296/37.8 |
| 6,926,329 B2 * | 8/2005 | Neumann et al. | 296/24.34 |
| 2002/0101091 A1 * | 8/2002 | Ito | 296/37.12 |
| 2005/0006918 A1 * | 1/2005 | Neumann et al. | 296/24.34 |
| 2006/0075934 A1 * | 4/2006 | Ram | 108/44 |
| 2007/0138822 A1 * | 6/2007 | Feit et al. | 296/70 |

FOREIGN PATENT DOCUMENTS

| DE | 199 38 690 | 8/1999 |
|---|---|---|
| DE | 200 15 730 | 9/2000 |
| EP | 1 151 890 | 4/2001 |
| JP | 8-9291 | 1/1996 |
| JP | 11-165562 | 6/1999 |
| JP | 11-342797 | 12/1999 |
| JP | 2001-71967 | 3/2001 |
| WO | 97/46422 | 12/1997 |
| WO | 03/11647 | 2/2003 |

OTHER PUBLICATIONS

German Search Report for corresponding Application No. 10 2005 062 316.6 dated Mar. 1, 2006.

* cited by examiner

*Primary Examiner*—David M Fenstermacher
(74) *Attorney, Agent, or Firm*—Renner, Otto, Boisselle & Sklar, LLP

(57) ABSTRACT

A device for movable support for an input/output unit, especially a flat screen, which is electromotively pivotable from a lying non-use position into an upright position of use and vice versa and which in the non-use position is covered by a cover. The movement of the cover is coupled with the movement of the input/output unit by means of a cam plate as coupling element.

8 Claims, 3 Drawing Sheets

DEVICE FOR MOVABLE SUPPORT OF AN INPUT/OUTPUT UNIT

TECHNICAL FIELD OF THE INVENTION

The invention relates to a device for movable support of an input/output unit.

The invention is intended in particular for installation and use in motor vehicles, and is basically suitable for use in other land, air or water vehicles as well. The input/output unit under consideration is in particular a flat screen or a display. The input/output unit can also have keys or other input elements.

The input/output unit of the device according to the invention is pivotable about in particular a horizontal axis out of a lying non-use position into an upright position of use and vice versa, the terms "lying" and "upright" relating to a planned installation position of the device. In its upright position of use, the input/output unit is visible to and can be read by or operated by the occupants of the vehicle. In its non-use position, the input/output unit is let in flush, for example, in a kind of housing in a dashboard. Pivoting of the input/output unit is effected by means of a preferably electromotive drive.

Furthermore, the device according to the invention has a cover, which covers the input/output unit in its non-use position. The cover is in that case in a closed position. It closes off, for example, a dashboard opening, through which the input/output unit pivots upwards into the upright position of use. In the opened position, the cover is located preferably behind the input/output unit in its upright position of use, the description "behind" relating to the line of sight of the occupants.

To guide and move the cover, the device according to the invention comprises a positive, planar, multi-link gear mechanism, which forms a kinematic chain.

DESCRIPTION OF RELATED ART

A device for movable support of an LCD flat screen in a dashboard of a motor vehicle is disclosed in DE 100 08 887 A1. The known device comprises a screen pivotable about a horizontal axis, the screen being pivotable out of an obliquely downwardly directed non-use position let in flush in an opening in the dashboard, into a vertically or obliquely upright position of use. In the position of use, the screen of the known device projects upwards out of the opening in the dashboard and is visible to the vehicle occupants. A cover of the known device closes off the opening in the dashboard and covers the screen when the screen has been pivoted downwards into the non-use position and let in flush in the dashboard. As the screen is pivoted into the position of use, the cover pivots about a likewise horizontal axis into the opening in the dashboard and back behind the screen. The screen and the cover of the known device are constrained to pivot jointly with one another; they are coupled by means of a slotted control means. The known device requires a large installation space for the pivoting movements of the screen and the cover.

SUMMARY OF THE INVENTION

The invention is based on the technical problem of proposing a device of the kind explained above that allows a construction taking up little space.

The device according to the invention comprises a coupling element, which synchronises the movement of the input/output unit and the movement of the cover. The coupling element is driven by the drive of the input/output unit and in turn drives the gear mechanism of the cover. Synchronisation is to be understood to mean a co-ordination of the movements of the cover and of the input/output unit that prevents collision of the cover and the input/output unit during opening and setting up into the position of use respectively and during the reverse movements of the cover and the input/output unit. Synchronisation means, although not necessarily so, a simultaneous movement of the cover and the input/output unit or a movement with a speed ratio that is always constant. In phases of the movements, the cover or input/output unit can be slower or faster than in other phase of the movement, and the cover and/or input/output unit can also be stationary during phases of the movements.

The coupling element facilitates the drive of the input/output unit and of the cover using a common drive. A further advantage of the coupling element is the synchronisation of the movements of the input/output unit and of the cover and the prevention of a collision of the two parts.

The coupling element can be, for example, a cam plate or similar. In one construction according to the invention the coupling element is pivotally mounted. It is, for example, pivotally mounted in a fixed position on a lateral wall of a housing of the device. One construction according to the invention provides for the coupling element to have a curve, which is followed by the drive as the input/output unit is pivoted, the drive moving the coupling element, which in turn activates the gear mechanism of the cover. The curve can be, for example, a cranked track and the coupling element can be a cam plate or slotted plate. The shaping of the curve allows the input/output unit and the cover to be synchronised in the desired manner and the ratio of the speeds of the movements of the input/output unit and the cover to be altered in the desired manner during pivoting of the input/output unit.

One construction according to the invention provides intermeshing toothings of the coupling element and the gear mechanism of the cover for driving the gear mechanism, and hence the cover, by the coupling element. The toothings can be circular in the manner of gearwheels or alternatively in the form of a gearwheel meshing with a toothed rack. At least one of the two intermeshing toothings can be straight or be formed with a curvature other than circular, that is, with a curved course. The toothings have the advantage that they ensure the synchronous running of the coupling element and the cover; the position of the coupling element determines the position of the cover explicitly.

One construction according to the invention provides a drive track, along which the drive of the device moves as the input/output unit is pivoted. The drive track can be a housing toothing or stationary toothing in the manner of a toothed rack with which an electromotively driven gearwheel of the drive meshes. The toothed rack need not be straight; it may run in a curve or arc.

One construction according to the invention provides a four-bar linkage as gear mechanism and guidance for the cover of the device. If the four-bar linkage is in the form of a parallelogram, during opening and closing the cover is displaced parallel on a circular arc-shaped path. If the linkage is other than a four-bar linkage, in addition to its translatory motion the cover can be pivoted on a circular arc-shaped path. With a four-bar linkage, a low-priced, stable and reliable guidance of the cover is possible in a simple manner. The geometry of the four-bar linkage allows a desired movement of the cover to be achieved.

BRIEF DESCRIPTION OF THE DRAWINGS

The invention is explained in greater detail below with reference to an exemplary embodiment illustrated in the drawings.

DETAILED DESCRIPTION OF THE EMBODIMENTS

Figure 1:
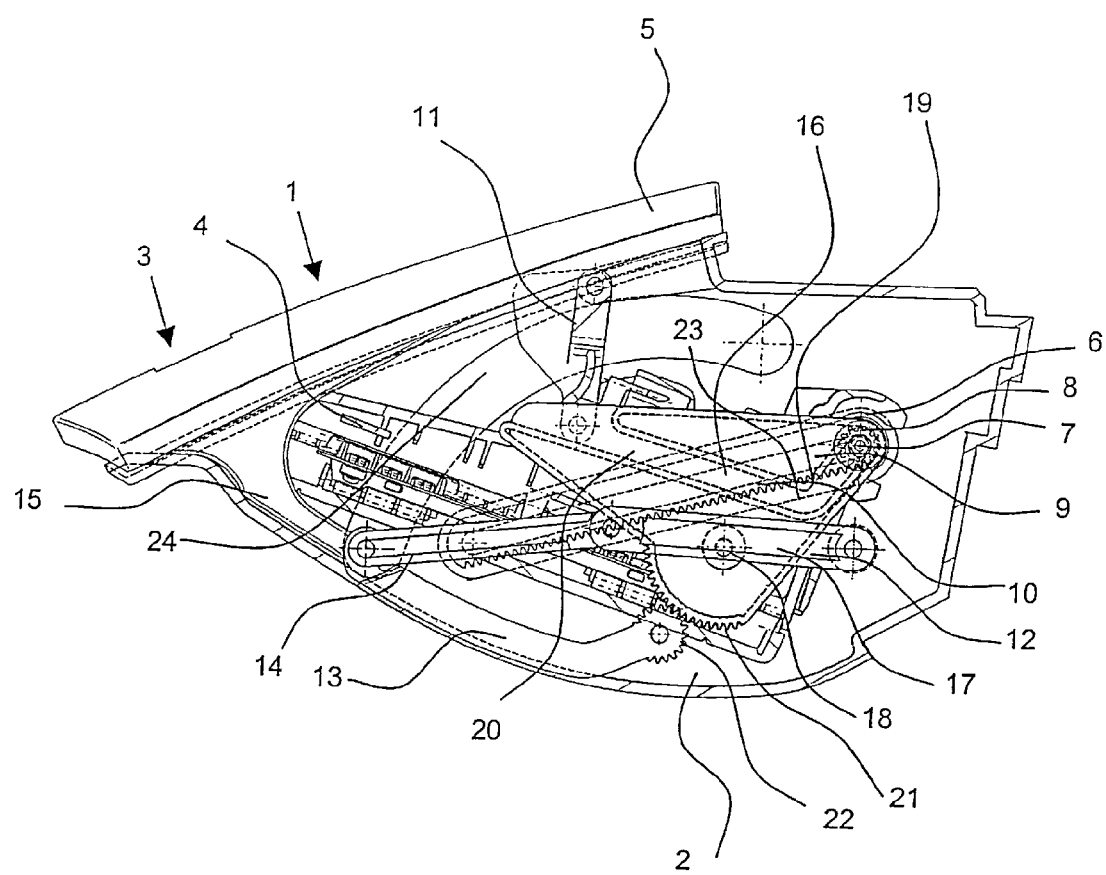
FIGS. 1 to 3 show side views of a device according to the invention in different positions.

The device 1 according to the invention illustrated in the drawings comprises a box-form housing 2 having an opening 3, which in a planned installation position is situated at a top face of the housing 2 and occupies more than half of the top face of the housing 2. The device 1 is intended for installation in a dashboard (not shown) of a motor vehicle. The housing 2 is shown transparent, to render built-in parts visible. A screen 4, for example an LCD flat screen, which forms an output unit and is intended as multi-function display for driver information, is housed in the housing 2. In principle, the screen 4 can also have keys and other operating elements, or can be what is known as a touch screen, and hence form an input/output unit. In a closed position illustrated in FIG. 1, the screen 4 is let in flush in the housing 2 in a lying position, with its viewing side directed downwards. A cover 5 closes off the opening 3 of the housing 2. In an opened position illustrated in FIG. 3, the cover 5 is raised a little above the opening 3 and moved backwards. The screen 4 is raised projecting upwards out of the opening 3 of the housing 2 and has a slight backward inclination. It is easily visible to and readable by vehicle occupants, especially the driver and/or a passenger. The cover 5 is behind the screen 4, seen in the line of sight of the driver and/or passenger.

The screen 4 has an electromotor 6 with a flange-mounted reduction gear unit for the drive. The electromotor 6 drives a drive shaft 7, which passes transversely through the housing 2 and at each end has gear wheels 8 fixed to it in a rotationally secure manner. The gearwheels 8 are located in slots 9 in the lateral walls of the housing 2. An edge of each slot 9 has a toothing, i.e. it forms a toothed rack 10 with which the gearwheel 8 meshes. In the exemplary embodiment of the invention illustrated, the slots 9 and the toothed racks 10 are straight, although in principle it is also possible for the slots 9 and the toothed racks 10 not to run straight. Through rotary driving of the drive shaft 7 and the gearwheels 8 fixed thereon in a rotationally secure manner by means of the electromotor 6, the lower, rear end of the screen 4, where the electromotor 6 is mounted, can be moved forwards and backwards in the housing 2, and the screen 4 can hence be pivoted out of the lying position illustrated in FIG. 1 with the viewing side directed downwards, via the intermediate position illustrated in FIG. 2, into the upright position illustrated in FIG. 3 with the viewing side directed to the front, i.e. facing the driver and/or passenger or in general an occupant of the vehicle.

The term "front" means a side facing towards the interior of the vehicle, in which the device 1 has been installed, or rather the side facing an occupant. The term "rear" accordingly means a side facing away from the vehicle interior or rather an occupant. Approximately at mid-height, the screen 4 is connected in an articulated manner to the housing 2 by means of a rocker 11. The rocker 11 forms a pivoted lever, one end of which is connected in an articulated manner to the screen 4 and the other end of which is connected in an articulated manner to the lateral walls of the housing 2.

The cover 5 is guided by means of a four-bar linkage on each lateral wall of the housing 2. The two four-bar linkages form positive, multi-link planar gear mechanisms, and are located on outer sides of the lateral walls of the housing 2. Each four-bar linkage comprises two pivoted levers 12, 13, one end of each of which is pivotally mounted on the respective lateral wall of the housing 2. The other ends of the pivoted levers 12, 13 are pivotally connected to a third lever 14, with which a curved arm 15 projecting rigidly downwardly from the cover 5 is rigidly connected. The arm 15 of the cover 5 passes through the opening 3 in the housing 2 and passes through a circular arc-shaped slot 24 in the lateral wall of the housing 2. By pivoting the pivoted levers 12, 13 forwards and backwards, the cover 5 is raised upwards out of the closed position illustrated in FIG. 1 from the opening 3 of the housing 2 and moved backwards via the position illustrated in FIG. 2. The two pivoted levers 12, 13 are not exactly parallel with one another, they do not form an exact parallelogram with the lever 14. The movement of the cover 5 is consequently not an exclusively translatory movement on a notional circular arc path, the cover 5 pivots a little during its movement.

The drive of the cover 5 is effected by means of an electromotor 6, which is mounted at the bottom on the rear side of the screen 4 and drives the same. On outer sides of the gearwheels 8 the drive shaft 7 has journals, which engage in a channel 16 of a cam plate 17. The cam plate 17 forms a coupling element that couples the movement of the cover 5 with the movement of the screen 4. The channel 16 of the cam plate 17 can also be referred to as a curve or as a guide channel or cranked path and the cam plate 17 can be referred to as a slotted plate. The cam plate 17 is pivotally mounted on an outer side of the lateral walls of the housing 2 by means of a journal bearing 18. The curve 16 is angled, it has a short section 19 and a long section 20, which run at an angle to one another and meet at a vertex 23. In each pivoted position the curve 16 has an intersection point with the slot 9 in the lateral wall of the housing 2 or it runs congruent with the slot 9.

Figure 2:
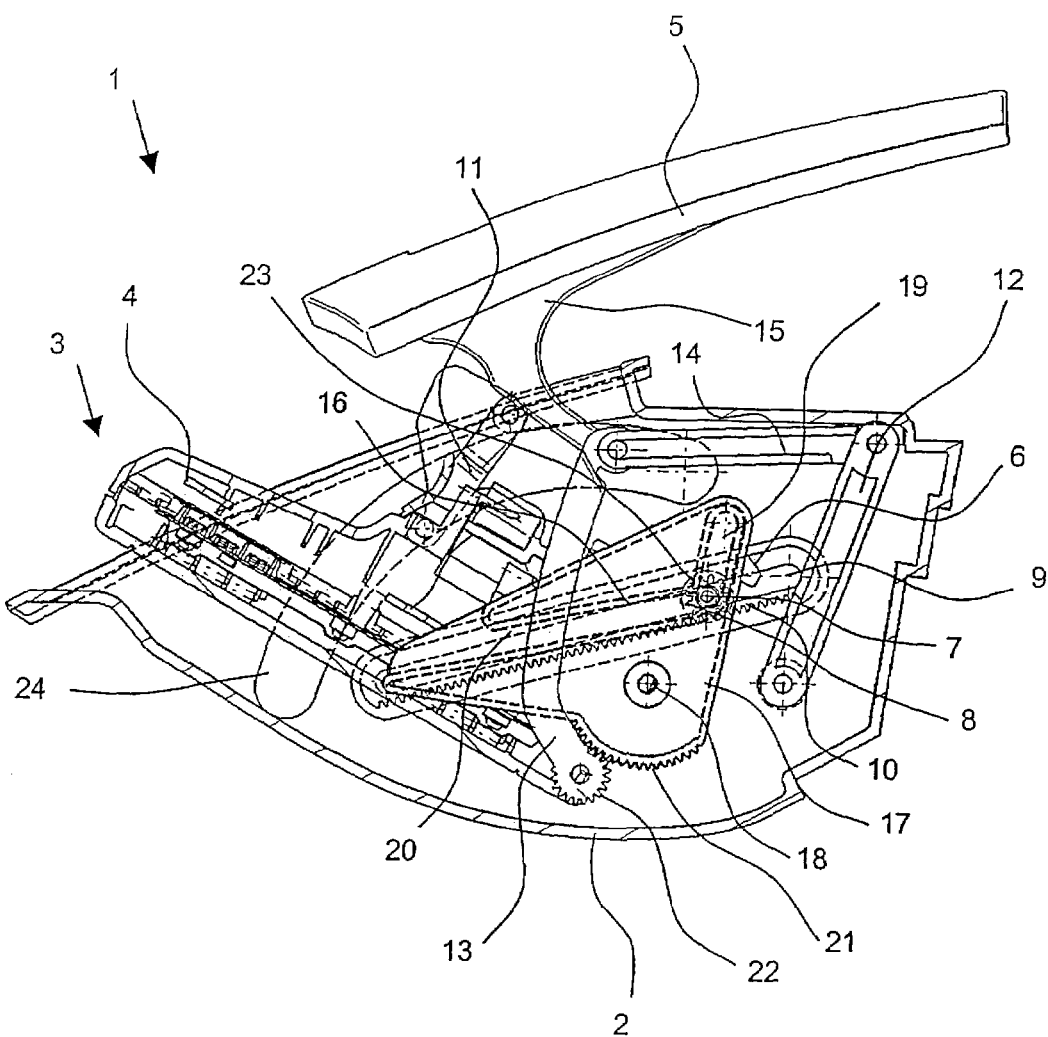
Figure 3:
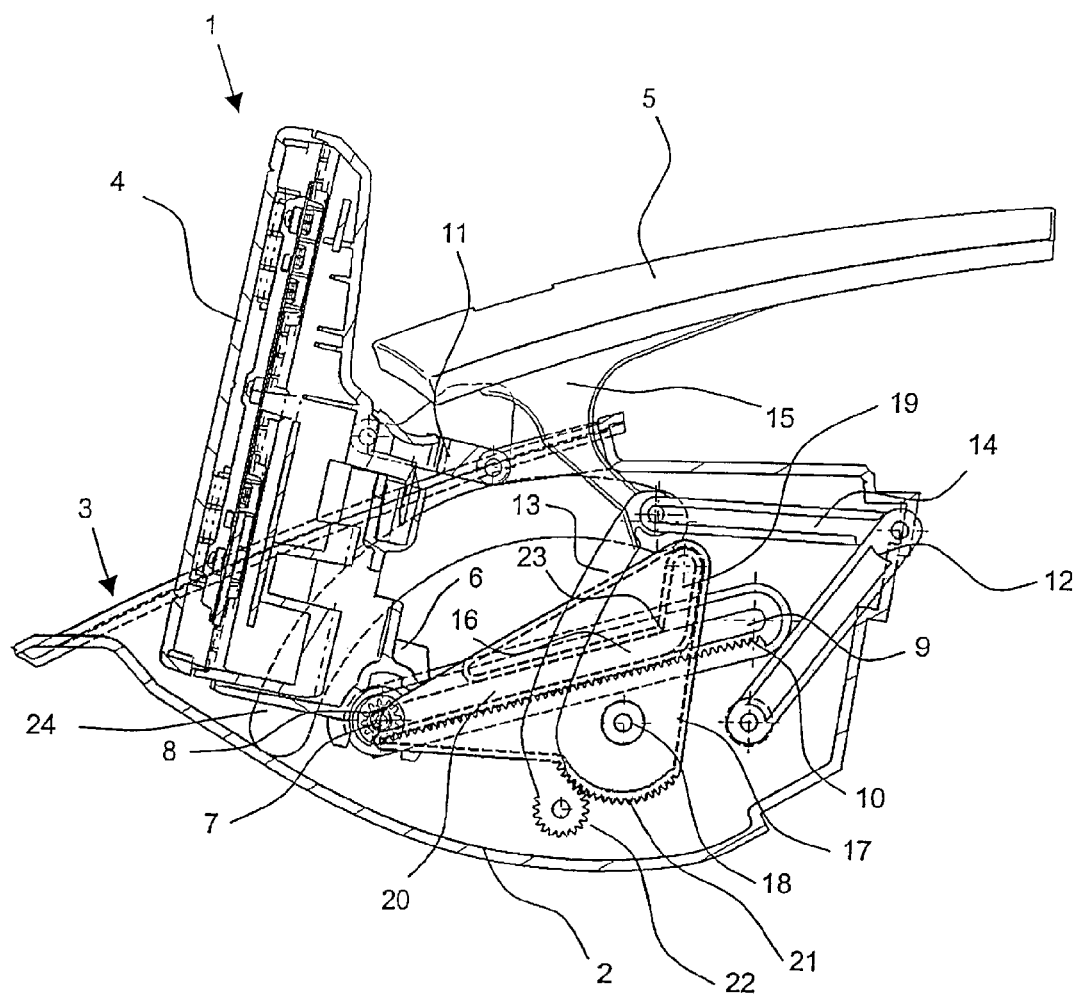

If the drive shaft 7 moves through rotating drive by means of the electromotor 6 forwards from the rear in the slot 9, i.e. out of the closed position illustrated in FIG. 1 into the open position illustrated in FIG. 3, its journal moves from the end of the short section 19 of the channel 16 to the vertex 23 and then along the long section 20 of the channel 16. During movement in the short section 19, the journal of the drive shaft 7 pivots the cam plate 17 out of the position illustrated in FIG. 1 into the position illustrated in FIG. 2. In the position of the cover 5 and the screen 4 illustrated in FIG. 2, the journal of the drive shaft 7 is located approximately at the vertex 23 of the angled channel 16. The cam plate 17 is pivoted so that the long section 20 of the channel 16 is congruent with the slot 9 in the lateral wall of the housing 2. Upon further movement of the drive shaft 7, its journal moves in the long section 20 of the curve 16. Since the long section 20 runs parallel to the slot 9 in which the drive shaft 7 is moving, the cam plate 17 no longer causes pivoting. The cover 5 consequently also no longer moves, the cover 5 has thus already reached its open position in FIG. 2 and no longer moves, whilst the screen 4 is first pivoted a little upwards and is then pivoted upwards into the upright position illustrated in FIG. 3. The journal of the drive shaft 7 locks the cam plate 17 when the journal is located at a distance from the vertex 23 of the channel 16 in its long section 20 congruent with the slot 9. In co-operation with the slot 9 in the lateral wall of the housing 2, and of the drive shaft 7 with the gearwheel 8 and the journal engaging in the channel 16 of the cam plate 17, the cam plate 17 constitutes a locking device for the cover 5, and locks this when it has reached its open position, to be seen in FIGS. 2 and 3.

The cam plate 17 comprises a circular arc-shaped toothing 21, which meshes with a gearwheel-form toothing 22 of one of the two pivoted levers 13. The pivoted drive of the cam plate 17 causes the one pivoted lever 13 to pivot and overall drives the gear mechanism in the form of a four-bar linkage comprising the pivoted levers 12, 13 and the lever 14 and guiding and moving the cover 5.

The described components that move the screen 4 and the cover 5 are provided congruently on both sides of the housing 2 and move synchronously. Synchronisation is effected by means of the drive shaft 7, which passes transversely through the housing 2 and in each lateral wall of the housing 2 meshes with the toothed rack 10.

The invention claimed is:

1. A device for movable support of an input/output unit, having a drive for pivoting the input/output unit from a lying non-use position into an upright position of use and vice versa, having a cover that is non-contiguous with the input/output unit, which in a closed position covers the input/output unit in the non-use position, and having a positive, multi-link, planar gear mechanism, which forms a kinematic chain and a guide for the cover, which moves the cover out of the closed into the open position and vice versa, wherein the device comprises a coupling element, which synchronises the movement of the input/output unit and the movement of the cover, in that the coupling element is driven by the drive of the input/output unit and drives the gear mechanism of the cover.

2. A device according to claim 1, wherein the coupling element is pivotally mounted.

3. A device according to claim 1, wherein the coupling element comprises a curve, which is followed by the drive upon pivoting of the input/output unit, the drive in the process moving the coupling element.

4. A device according to claim 1, wherein the coupling element locks the cover in the open position.

5. A device according to claim 1, wherein the coupling element comprises a toothing, which meshes with a corresponding toothing of the gear mechanism of the cover.

6. A device according to claim 1, wherein the device comprises a drive track, along which the drive moves during pivoting of the input/output unit.

7. A device according to claim 1, wherein the gear mechanism of the cover comprises a four-bar linkage.

8. A device according to claim 1, wherein the cover reaches its open position before the input/output unit reaches its position of use.

* * * * *